United States Patent
Franson

(10) Patent No.: US 12,362,477 B2
(45) Date of Patent: Jul. 15, 2025

(54) INTEGRATED ANTENNA ARRAY AND BEAMFORMER IC CHIPS WITH INTER-STAGE AMPLIFICATION

(71) Applicant: VIASAT, INC., Carlsbad, CA (US)

(72) Inventor: Steven J. Franson, Scottsdale, AZ (US)

(73) Assignee: VIASAT, INC., Carlsbad, CA (US)

( * ) Notice: Subject to any disclaimer, the term of this patent is extended or adjusted under 35 U.S.C. 154(b) by 303 days.

(21) Appl. No.: 18/001,026

(22) PCT Filed: Mar. 4, 2021

(86) PCT No.: PCT/US2021/020973
§ 371 (c)(1),
(2) Date: Dec. 7, 2022

(87) PCT Pub. No.: WO2021/252036
PCT Pub. Date: Dec. 16, 2021

(65) Prior Publication Data
US 2023/0223686 A1    Jul. 13, 2023

Related U.S. Application Data

(60) Provisional application No. 63/038,091, filed on Jun. 11, 2020.

(51) Int. Cl.
*H01Q 3/36* (2006.01)
*H01Q 1/22* (2006.01)
(Continued)

(52) U.S. Cl.
CPC ............ *H01Q 3/36* (2013.01); *H01Q 1/2283* (2013.01); *H01Q 1/48* (2013.01); *H01Q 9/0407* (2013.01)

(58) Field of Classification Search
CPC ............ H01Q 3/36; H01Q 1/2283; H01Q 1/48
See application file for complete search history.

(56) References Cited

U.S. PATENT DOCUMENTS

2013/0113657 A1   5/2013   Behbahani et al.
2013/0308717 A1*  11/2013  Maltsev ............... H04B 7/0417
                                                              375/267

(Continued)

FOREIGN PATENT DOCUMENTS

| CN | 109155459 A | 1/2019 |
| KR | 10-2012-0091888 A | 8/2012 |
| KR | 10-2017-0070816 A | 6/2017 |

OTHER PUBLICATIONS

International Search Report and Written Opinion dated Jun. 2, 20219 in corresponding PCT Application No. PCT/US2021/020973 (10 pages).

*Primary Examiner* — Timothy A Brainard
*Assistant Examiner* — Helena H Seraydaryan
(74) *Attorney, Agent, or Firm* — F. CHAU & ASSOCIATES, LLC

(57) ABSTRACT

An antenna apparatus includes a first component layer having a plurality of antenna elements forming an antenna array. A second component layer includes: (i) a plurality of RFICs coupled to the antenna elements, where each RFIC has active beamforming circuitry to adjust signals communicated with one or more of the antenna elements, and a portion of a first stage of a beamforming network (BFN); and (ii) an additional stage and a further stage of the BFN, each disposed externally of the RFICs. At least some of the RFICs include an intermediate amplifier coupled between the additional and further stages of the BFN.

20 Claims, 8 Drawing Sheets

(51) Int. Cl.
*H01Q 1/48* (2006.01)
*H01Q 9/04* (2006.01)

(56) References Cited

U.S. PATENT DOCUMENTS

| | | |
|---|---|---|
| 2017/0005416 A1 | 1/2017 | Gendron et al. |
| 2019/0013580 A1 | 1/2019 | Vigano et al. |
| 2019/0312330 A1 | 10/2019 | Madsen et al. |

* cited by examiner

INTEGRATED ANTENNA ARRAY AND BEAMFORMER IC CHIPS WITH INTER-STAGE AMPLIFICATION

RELATED APPLICATIONS

The present Application is a 371 National Stage entry of PCT application no. PCT/US2021/020973, filed Mar. 4, 2021, which claims the benefit of priority to U.S. Provisional Application No. 63/038,091 filed on Jun. 11, 2020, entitled, "Integrated Antenna Array and Beamformer IC Chips with Inter-Stage Amplification", the entireties of which are incorporated herein by reference.

TECHNICAL FIELD

This disclosure relates generally to antenna arrays integrated with distributed beamformer integrated circuit (IC) chips.

DISCUSSION OF RELATED ART

Antenna arrays are currently deployed in a variety of applications at microwave and millimeter wave frequencies, such as in aircraft, satellites, vehicles, and base stations for general land-based communications. Such antenna arrays typically include microstrip radiating elements driven with phase shifting beamforming circuitry to generate a phased array for beam steering. It is typically desirable for an entire antenna system, including the antenna array and beamforming circuitry, to occupy minimal space with a low profile while still meeting requisite performance metrics. In the commercial environment, a low cost design is desirable for antenna arrays/phased arrays. Low cost phased arrays are highly sought in markets such as unmanned aerial vehicles (UAVs), small manned aircraft such as regional and business aircraft, self-driving vehicles and watercraft.

An embedded antenna array may be defined as an antenna array constructed with antenna elements integrated with radio frequency (RF) integrated circuit chips (RFICs) (sometimes called "beamformer ICs" (BFICs)) in a compact structure. An embedded array may have a sandwich type configuration in which the antenna elements are disposed in an exterior facing component layer and the RFICs are distributed across the effective antenna aperture within a proximate, parallel component layer behind the antenna element layer. The RFICs may include RF power amplifiers (PAs) for transmit and/or low noise amplifiers (LNAs) for receive and/or phase shifters for beam steering. By distributing PAs/LNAs in this fashion, higher efficiency on transmit and/or improved noise performance on receive are attainable. Reliability of the antenna array may also be improved, since the overall antenna performance may still be acceptable even if a small percentage of the amplifiers malfunction. The RFICs typically include other beamforming circuitry such as filters, impedance matching elements, RF couplers, transmit/receive (T/R) switches and control lines.

SUMMARY

In an aspect of the present disclosure, an antenna apparatus includes a first component layer having a plurality of antenna elements forming an antenna array. A second component layer includes: (i) a plurality of RFICs coupled to the antenna elements, where each RFIC has active beamforming circuitry to adjust signals communicated with one or more of the antenna elements, and a portion of a first stage of a beamforming network (BFN); and (ii) an additional stage and a further stage of the BFN, each disposed externally of the RFICs. At least some of the RFICs include an intermediate amplifier coupled between the additional and further stages of the BFN.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Figure 1:
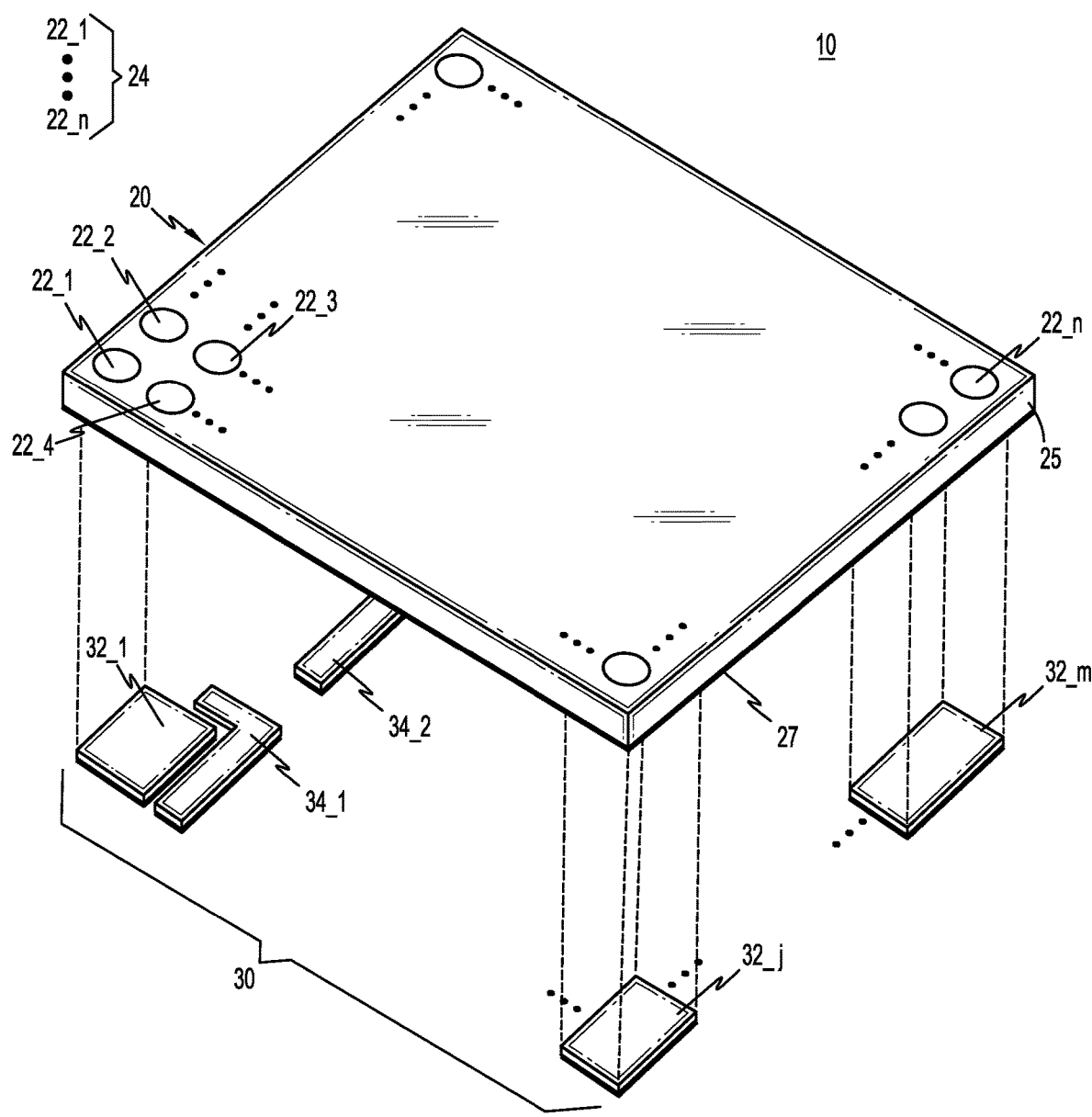
FIG. 1 is an exploded perspective view of an example antenna apparatus according to an embodiment.

FIG. 1 is an exploded perspective view of an example antenna apparatus according to an embodiment. Antenna apparatus 10 ("antenna 10") includes first and second component layers 20, 30 arranged in a stacked structure. First component layer 20 is an antenna component layer including a plurality of antenna elements 22_1 to 22_N forming a planar antenna array 24. Antenna elements 22 may be microwave or millimeter wave patch antenna elements formed on an upper surface of a plate-like antenna substrate 25. Second component layer 30 is a beamforming component layer that may include a plurality of RFICs 32_1 to 32_M, coplanarly arranged and distributed across the effective aperture of the antenna array 24, where each RFIC 32 is coupled to at least one antenna element 22. In embodiments discussed hereafter, each RFIC 32 is coupled to a plurality of antenna elements 22. It is noted here that any RFIC 32 may also be referred to interchangeably as a "beamformer IC" (BFIC) by virtue of the beamforming circuitry included therein.

Each RFIC 32 may include active beamforming circuitry, e.g., an amplifier and/or a phase shifter used to adjust one or more signals communicated with its respective antenna element(s) 22. Each RFIC 32 may further include a first portion of a beamforming network (BFN). The BFN has a plurality of combining/dividing stages, and the first portion of the BFN is at least one of the combining/dividing stages (hereafter, just "stages" of a BFN). A second portion of the BFN is disposed on a printed circuit board (PCB) (a dielectric substrate) such as PCB sections 34_1, 34_2, and can include the remaining stages of the BFN. Thus, the first and second portions of the BFN, provided on-chip and off-chip, respectively, form a hybrid beamformer. The hybrid beamformer can provide higher performance and lower cost as compared to implementing the entire BFN on only ICs or only a PCB. The hybrid beamformer can permit flexibility and a lower development cost by allowing for the use of more general RFICs in conjunction with the PCB circuitry. In addition, the hybrid beamformer can avoid the mechanical challenges and yield issues associated with implementing the entire beamformer on just the PCB or just RFICs.

In conjunction with the hybrid approach, intermediate amplifiers are included within RFICs 32 to provide inter-stage amplification between different PCB stages of the BFN. (Herein, any "amplifier" such as an intermediate amplifier or an RF front-end amplifier, can be configured as a single stage amplifier or a multi-stage amplifier.) Thus, an individual RFIC 32 may include both a "Level 1" amplifier to amplify element signals directly routed to/from to an antenna element, and a "Level 2" amplifier (an intermediate amplifier) to amplify signals in between PCB stages. Still another RFIC 32 may include a "Level 3" amplifier to amplify a signal further downstream the BFN (from/to a different PCB stage). The use of RFICs 32 to provide multiple inter-stage amplification may reduce the total number of RFICs 32 needed for antenna 10, thereby reducing manufacturing cost and complexity. This can also result in a more compact beamformer as compared to one that uses dedicated RFICs for respective Level 1 and Level 2 amplification functions, since the dedicated RFICs would be placed in accordance with minimum spacing requirements.

In antenna 10, RFICs 32_1 to 32_M collectively include combiner/dividers that together form at least one stage of the BFN. The BFN is a combiner/divider network that divides an input RF transmit signal into N divided "element signals" for transmission by antenna array 24 and/or combines N receive path element signals received by the N antenna elements 22_1 to 22_n into a final composite receive signal. The receive path and associated components/signals will be discussed hereafter as an example, but embodiments that alternatively or additionally include transmit path capability may operate analogously. Each "stage" of the BFN includes at least one combiner that combines K input signals on K respective first receive paths into K/Q (Q≥2) combined output signals on K/Q second receive paths, respectively. In examples of BFN "stages" discussed hereafter, Q=2 for simplicity of understanding, but "Q" may be considered variable throughout a BFN. For instance, some portions of a BFN may have 2:1 combiners as a "stage" whereas other portions of the BFN may have 4:1 combiners as another stage, etc. Each stage of the BFN also includes transmission lines, which are the receive paths themselves, connecting the combiners of adjacent stages. Herein, the first stage of the BFN comprises the set of combiner/dividers closest to the antenna elements, where front end active beamforming circuitry of RFICs 32 is disposed between the first stage combiner/dividers and the antenna elements. Note that in some embodiments, additional combiner/dividers can be included between the front end beamforming circuitry and the antenna elements 22, e.g., in another layer of antenna substrate 25. However, such additional combiner/dividers are not considered to form part of any stage of the BFN discussed herein.

Second component layer 30 includes the second portion of the BFN disposed externally of the RFICs 32, where the second portion may include at least an additional stage and a further stage of the BFN. (It is noted here that labels such as "additional" and "further" may be used herein to distinguish other numerical labels. For example, if the RFICs 32 collectively include first and second stages of a BFN as the first portion of the BFN, and the second portion of the BFN includes third, fourth and fifth stages, any of the third, fourth or fifth stages may be considered an additional stage or a further stage of the BFN.) At least some of the RFICs 32 include an intermediate amplifier coupled between the additional and further stages of the BFN. The deployment of the intermediate amplifiers results in superior design flexibility for other amplifiers and circuit components of antenna apparatus 10. In the embodiment shown in FIG. 1, the second portion of the BFN is arranged on a PCB 34 collectively formed by at least one PCB section 34_i (e.g. PCB sections 34_1 and 34_2) coplanarly situated between RFICs 32. In this case, RFICs 32 and PCB 34 may each be mounted to a lower surface 27 of component layer 20, and signal lines within RFICs 32 may be wire bonded to signal lines printed on PCB 34. A majority of lower surface 27 may be plated with a metal layer to form a ground plane for reflecting radiated signal energy to/from antenna elements 22. Openings may be formed in the ground plane to allow electrical connection between signal connection points of RFICs 32 and through substrate vias (TSVs, hereafter just "vias") within antenna substrate 25 that form antenna feeds for antenna elements 22.

In another embodiment discussed later (see FIGS. 6, 7A and 7B) PCB sections 34_i between RFICs 32 are omitted, and a multi-layer PCB coextensive with first component layer 20 is provided between antenna elements 22 and RFICs 32 (where the antenna substrate 25 may form one layer of the multi-layer PCB). In this case, RFICs 32 may be mounted to the multi-layer PCB and the second portion of the BFN is formed within the multi-layer PCB.

In embodiments where RFICs 32 include dynamically controlled phase shifters, antenna 10 is operable as a phased array for transmit and/or receive operations. In a phased array embodiment, a beam formed by antenna 10 is steered to a desired beam pointing angle set mainly according to the phase shifts of the phase shifters. (Additional amplitude adjustment within RFICs 32 may also be included to adjust the beam pointing angle.) With RF front end amplifiers and/or phase shifters distributed across the effective aperture of antenna array 24, antenna 10 may be referred to as an active antenna array. In some embodiments, antenna 10 operates as both a transmitting and receiving antenna system, and each RFIC 32 includes receive circuitry comprising at least one low noise amplifier (LNA) for amplifying a receive signal, and at least one power amplifier (PA) for amplifying a transmit signal. In this case, each RFIC may include suitable transmit/receive (T/R) switching/filtering circuitry to enable bidirectional signal flow on shared resources. Antenna 10 may alternatively be configured to operate only as a receive antenna system or only as a transmit antenna system, in which case each RFIC 32 includes an LNA but not a PA, or vice versa.

Antenna elements 22 may each be a microstrip patch antenna element printed on antenna substrate 25 and electrically or electromagnetically coupled to ("fed from") an RFIC 32 at a respective feed point. Other types of antenna elements such as dipoles or monopoles may be substituted. RFICs 32 may be mechanically connected to antenna substrate 25 by solder bump connections or the like to the ground plane and other connection pads located on antenna substrate 25.

In an example, antenna array apparatus 10 is configured for operation over a millimeter (mm) wave frequency band, generally defined as a band within the 30 GHz to 300 GHz range. In other examples, antenna apparatus 10 operates in a microwave range from about 1 GHz to 30 GHz, or in a sub-microwave range below 1 GHz. Herein, a radio frequency (RF) signal denotes a signal with a frequency anywhere from below 1 GHz up to 300 GHz. It is noted that an RFIC configured to operate at microwave or millimeter wave frequencies is often referred to as a monolithic microwave integrated circuit (MMIC), and is typically composed of III-V semiconductor materials.

Antenna elements 22, when embodied as microstrip patches, may have any suitable shape such as square, rectangular, circular, elliptical or variations thereof, and may be fed and configured in a manner sufficient to achieve a desired polarization, e.g., circular, linear, or elliptical. The number of antenna elements 22, their type, sizes, shapes, inter-element spacing, and the manner in which they are fed may be varied by design to achieve targeted performance metrics. While examples of antenna apparatus 10 are described below with 64 or 60 antenna elements 22, in a typical embodiment antenna apparatus 10 includes hundreds or thousands of antenna elements 22. In embodiments described below, each antenna element 22 is a microstrip patch fed with a probe feed. The probe feed may be implemented as a via that electrically connects to an input/output (I/O) pad of an RFIC 32. An I/O pad is an interface that allows signals to come into or out of the RFIC 32. In other examples, an electromagnetic feed mechanism is used instead of a via, where each antenna element 22 is excited from a respective feed point with near field energy.

With a multi-layered structure as in FIG. 1 comprising integrated antenna elements 22 and RFICs 32, antenna apparatus 10 may be referred to as an embedded antenna array. In the following discussion, for convenience of description, the horizontal plane/direction will generally refer to the plane/direction parallel to the major surfaces of antenna apparatus 10 (parallel to an x-y plane as illustrated) and the vertical direction will be refer to the orthogonal direction, i.e., the thickness or "z" direction of antenna apparatus 10.

Figure 2:
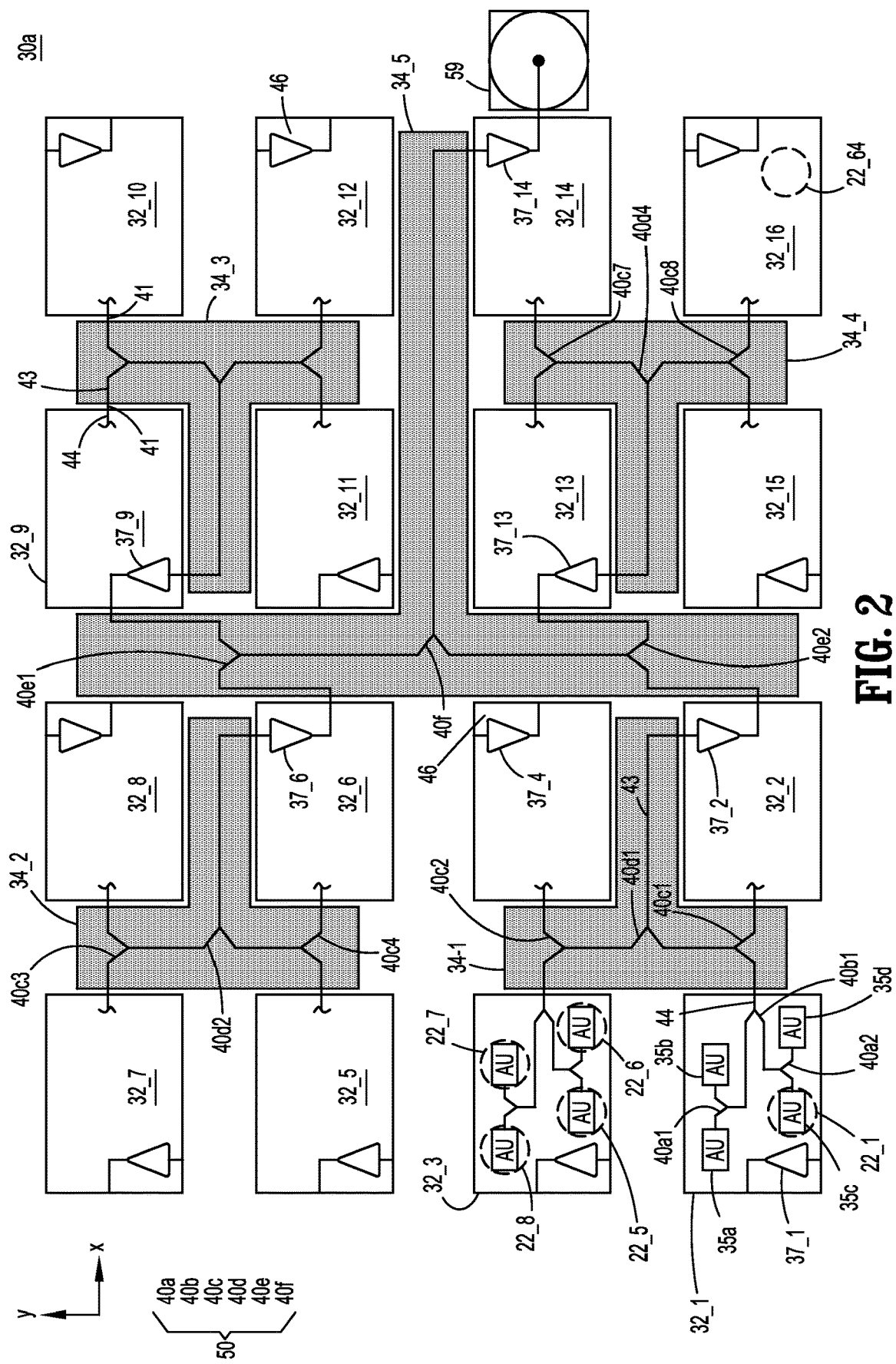
FIG. 2 is a plan view of an example layout of a component layer in the antenna apparatus of FIG. 1.

FIG. 2 is a plan view of an exemplary second component layer, 30a, of antenna apparatus 10. As an example to explain concepts of the disclosed technology, second component layer 30a is shown to include 16 RFICs 32_1 to 32_16 (M=16) and five PCB sections 34_1, 34_2, 34_3, 34_4 and 34_5. In an example, each PCB section 34_i is formed with an alumina substrate and a microstrip construction with a signal line 43 on one major surface and a ground plane (not shown) on the opposite surface. Alternatively, each PCB section 34_i may embody other types of transmission lines such as coplanar waveguide or stripline. In any case, electrical connection between each signal line 43 and an adjacent signal line 44 within an RFIC 32 may be made through a wire bond 41 or other suitable connection scheme such as edge connections. A beamforming network (BFN) 50 in the example has six stages of combiners, 40a, 40b, 40c, 40d, 40e and 40f.

Each RFIC 32 may have an identical circuit configuration and layout, thereby affording a manufacturing advantage. Each RFIC 32 may include a plurality of active circuit units (AUs) 35, where an AU 35 includes an amplifier and/or a phase shifter and is coupled to at least one antenna element 22. In the example of FIG. 2, each RFIC 32 has four AUs, AU 35a, 35b, 35c and 35d, each coupled to a single respective antenna element 22, whereby each RFIC 32 is coupled to four antenna elements 22. Accordingly, in this design, 16 RFICs 32_1 to 32_16 are coupled to 64 antenna elements 22_1 to 22_64. In any given RFIC such as 32_1, "element signals" received by two antenna elements 22 are provided to two AUs 35a and 35b, respectively. These two element signals are adjusted (amplified and/or phase shifted and optionally filtered) by AUs 35a and 35b, and the adjusted receive signals are combined by a 2:1 combiner 40a1. Likewise, two element signals from two respective antenna elements 22 are adjusted and output by AUs 35c and 35d and these adjusted signals are combined by a 2:1 combiner 40a2. Combiners 40a1 and 40a2 of RFIC 32_1 are combiners of the first stage 40a of BFN 50. Thus, with 16 RFICs 32_1 to 32_16 in second component layer 30a, there may be 32 first stage combiners 40a1 to 40a32. Each RFIC 32 may also have one 2:1 combiner of a second stage of BFN 50 that combines the outputs of the first stage combiners. For example, RFIC 32_1 is shown to include combiner 40b1, which combines the combined signals from combiners 40a1 and 40a2.

In addition, RFICs 32_1 to 3216 may include intermediate amplifiers 37_1 to 37_16, respectively, each located in a corner region 46 of the respective RFIC. In this example layout, RFICs 32_1 to 32_16 are arranged in rows and columns and the corner regions 46 of the intermediate amplifiers 37 alternate diagonally from column to column in each row. In other words, the RFICs 32 are arranged in rows and columns along a two dimensional (2D) surface, and in each row, the RFICs 32 are successively rotated from column to column by 180° in a plane of the 2D surface. Only K<M of intermediate amplifiers 37_1 to 37_16 may be electrically coupled (by wire bonds 41) between different stages of BFN 50, each between an $i^{th}$ and $(i+1)^{th}$ stage of BFN 50. For instance, it is seen in the example design of component layer 30a that K=4 and i=4. Intermediate amplifiers 37_2, 37_6, 37_9 and 37_13 are coupled to BFN 50 between the fourth stage combiners 40d and fifth stage combiners 40e of BFN 50. Another amplifier 3714 at the end of BFN 50 may be provided to amplify the final composite signal, which in this design is an output signal of a sixth stage combiner 40f. The amplified final output signal is routed to an output RF connector 59 as a final composite receive signal. The remaining amplifiers 37_1, 37_3, etc. are not coupled to BFN 50.

With the RFICs 32 in each row being arranged in alternating orientations from column to column (the corner locations of amplifiers 37 alternate from column to column) a progressive layout is realized that enables each BFN stage to be closer to the center of the layout than the preceding BFN stage. This scheme facilitates the use of identical RFICs 32_1 to 32_16, thereby reducing the cost of antenna 10.

The choice of alumina as a substrate for PCB sections 34 affords certain advantages. Due to alumina's high dielectric constant, the power dividers 34 can be made smaller as compared to low dielectric constant substrates. Finer resolution is also obtainable with alumina using a thin film process, as compared to other substrates. Further, by using sections of alumina as shown in FIG. 2 rather than a single large piece with cutouts for the RFICs, the resulting integrated structure is mechanically robust.

Any suitable type of combiner/divider may be used for combiner/dividers 40c, 40d, etc. of BFN 50. Examples include Wilkinson dividers (e.g., with printed resistors between divided output lines); hybrid ring ("rat race") couplers and 90° branch line couplers. In cases where three or more signals are to be combined without additional adjustment, such as for portions of stages 1 and 2 within a single RFIC 32, a single P:1 combiner may be formed, where P=three or more. For instance, combiners 40a1, 40a2 and 40b1 may be integrated as part of a single 4:1 combiner.

By configuring some of the RFICs 32 with both "early stage" amplifiers (within AUs 35) and "later stage" intermediate amplifiers 37 to thereby provide multiple levels of amplification at different points in the BFN, the total number of ICs otherwise needed for antenna 10 can be reduced. As a result, the manufacturing cost of antenna 10 can be reduced and/or real estate of antenna 10 is freed up for other components. In the example of FIG. 2, front end amplifiers are provided before "stage 1" and intermediate amplifiers 37 are provided after stage 4, but these locations can be varied in other embodiments. In a receive antenna system as illustrated in FIG. 2, the locations of amplifiers at points within the BFN 50 can be a tradeoff between DC power consumption and noise figure performance. In general, for a receive antenna system it is desirable to have "front-end" amplifiers which are placed up front, i.e., close to the antenna elements, to lower the noise figure in the system. It is also desirable for the signal level throughout BFN 50 to be above a certain threshold, and therefore a design with a large percentage of total gain allocated up front may result in superior signal to noise performance, but this increases DC power consumption. Providing intermediate amplifier gain at later stage locations (e.g. after stage 4) can reduce the DC power consumption as compared to providing this gain an earlier stage. For example, if no intermediate amplification were to be provisioned then all the gain could be provided in front end amplifiers within AUs 35; however, this would require making the front end amplifiers larger, resulting in more DC power consumption. On the other hand, if no front end amplifiers are employed, all the necessary gain could possibly be achieved by a single output amplifier such as 37_14, but such a design would result in poor noise figure performance because of signal loss incurred throughout the BFN. Hence, the number of amplifiers, their locations, and their sizes/gain presents a design tradeoff.

In a transmit antenna system, the location of the amplifiers within the BFN can also be a design tradeoff based on optimizing DC power efficiency. Front end power amplifiers (PAs) may be placed in each of the AUs 35. The intermediate amplifiers 37 shown in FIG. 2 may be in the same corner locations but with input terminal locations and output terminal locations flipped around. Through use of amplifiers 37, some of the necessary gain can be realized by the front end amplifiers and the remaining gain by amplifiers 37. In this manner, DC power and efficiency may be optimized for a transmit antenna system.

Figure 3:
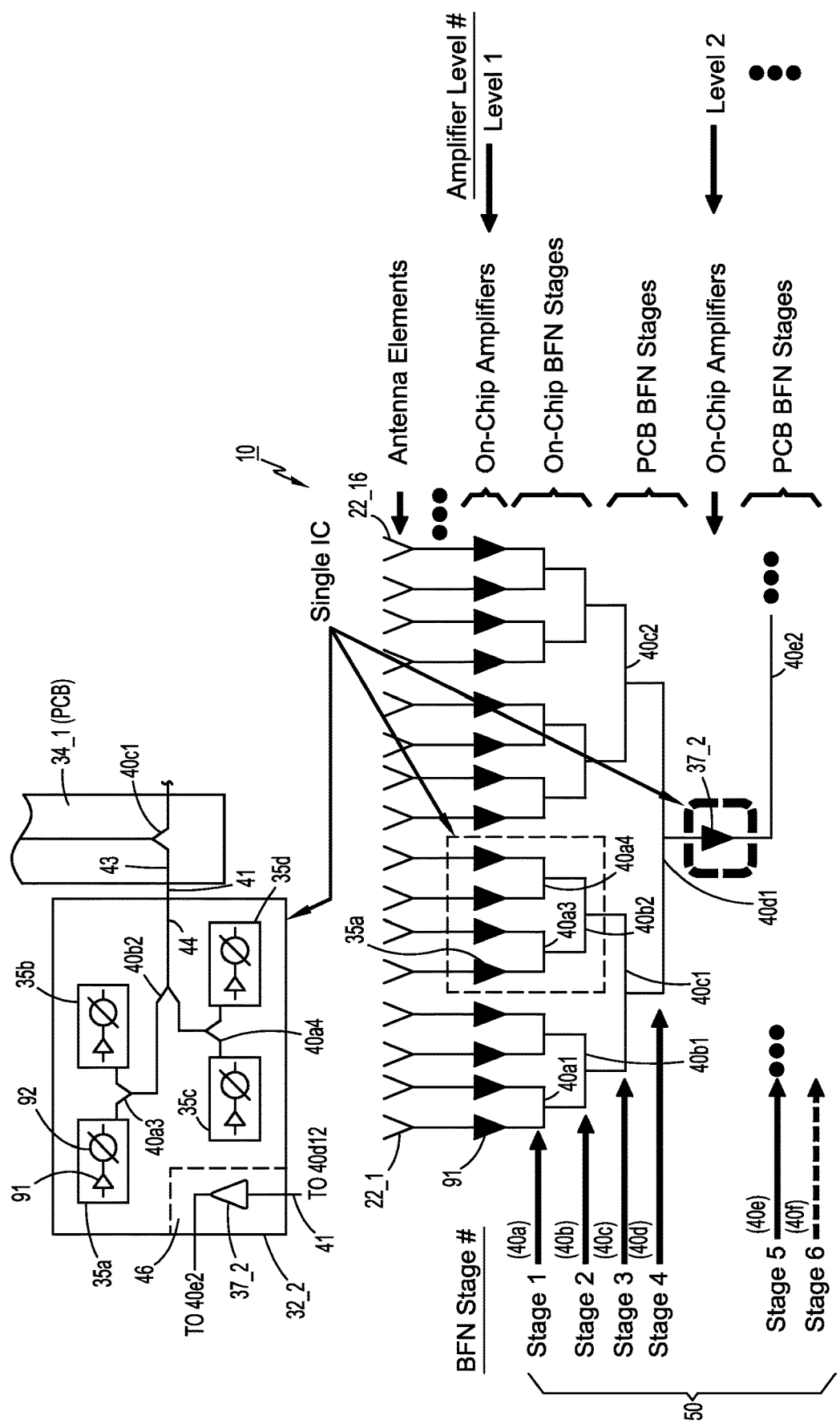
FIG. 3 is a schematic diagram of example beamforming circuitry within the antenna apparatus corresponding to the configuration of FIG. 2.

FIG. 3 is a schematic diagram of an example portion of beamforming circuitry within antenna 10, corresponding to a portion of second component layer 30a of FIG. 2. Referring to FIGS. 2 and 3, BFN 50 may have six stages of combiners, designated 40a to 40f, where combiners 40a and 40b (stages 1 and 2) are a first portion of BFN 50 and are formed within RFICs 31_1 to 32_16. Combiners 40c-40f (stages 3 through 6) are a second portion of BFN 50 and are formed within PCB sections 34_1 to 34_5.

FIG. 3 illustrates that a single RFIC, e.g., 32_2, may include at least one combining/dividing stage of BFN 50 as well as an intermediate amplifier 37_2 coupled between other BFN 50 stages. RFICs 32_1 to 32_16 may each have an identical configuration, each with an intermediate amplifier 37, but only some of the intermediate amplifiers 37 may be connected to the BFN 50. Amplifier 37_2 amplifies a partially combined receive signal/partially divided transmit signal. As noted above, the receive path will be discussed as an example. In the case of four AUs 35a-35d per each RFIC 32, two combining stages of BFN 50 are provided within each RFIC 32. Each AU 35a-35d may include a low noise amplifier (LNA) 91 and/or a phase shifter 92 to adjust (amplify and/or phase shift) an element signal received from a respective antenna element 22. In the example of FIG. 3, each of the AUs within second component layer 30a includes an on-chip LNA 91, which is considered a Level 1 amplifier. The intermediate amplifiers such as 37_2 are considered Level 2 amplifiers.

The adjusted element signals are output to and combined by 2:1 combiners 40a3 and 40a4 to provide respective first stage output signals. The first stage output signals are combined again by 2:1 combiner 40b2 which thereby outputs a second stage output signal to a third stage combiner 40c1 within PCB section 34_1. Third stage combiner 40c1 combines the second stage output signals from RFICs 32_1 and 32_2 to provide a third stage output signal to a fourth stage 2:1 combiner 40d1. Combiner 40d1 combines the third stage signals from combiners 40c1 and 40c2 to provide a fourth stage output signal, which is applied to intermediate amplifier 37_2. The amplified output thereof is then provided to fifth stage 2:1 combiner 40e2, which combines a similarly amplified output from intermediate amplifier 37_13 to thereby output a sixth stage combined signal. This combined signal is applied to output amplifier 37_14, and the amplified output thereof is supplied to an RF connector 59 as a final combined receive signal. RF connector 59 may be, for example, a vertically oriented coaxial connector (as illustrated in FIG. 2) or alternatively a horizontally oriented side mounted connector.

Figure 4:
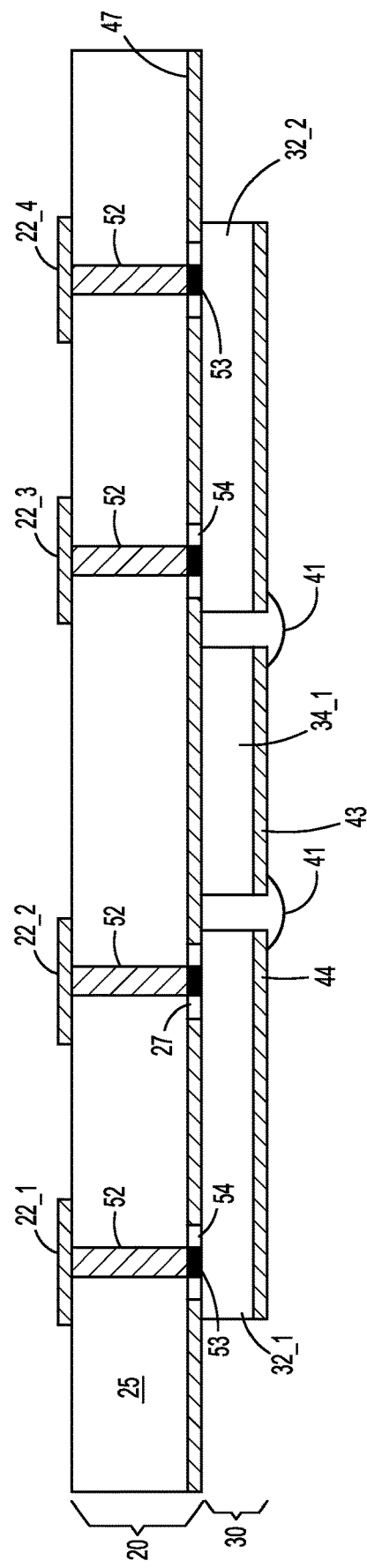
FIG. 4 is a cross-sectional view of a portion of the antenna apparatus, illustrating an example connection structure between component layers.

FIG. 4 is a cross-sectional view of a portion of antenna 10, illustrating an example connection structure between first and second component layers 20 and 30. In this embodiment, RFICs 32 and PCB sections 34_i are attached at their rear surfaces (facing upwards in FIG. 4) to the lower surface 27 of antenna substrate 25. Mechanical and electrical attachment may be made through electrical connection joints 53, e.g., solder joints, bumps or pillars. A majority of lower surface 27 may be a ground plane 47 for reflecting radiated signal energy to/from antenna elements 22. Openings 54 may have been formed in ground plane 47 to allow electrical connection between signal connection points of RFICs 32 and vias 52 through connection joints 53. Vias 52 formed within antenna substrate 25 serve as antenna feeds (e.g. probe feeds) for antenna elements 22. Electrical connection joints 53 may also be present between ground plane 47 and ground connection points on RFICs 32, and between ground plane 47 and the rear surface of PCB sections 34.

FIG. 4 illustrates adjacent RFICs 32_1 and 32_2 connected to PCB section 34_1 as an example. Signal lines (conductive traces) 43 on the front surface of PCB section 34_1 are connected to signal lines 44 on the front surface of RFICs 32_1 and 32_2 through wirebonds 41. (Herein, "ribbon bonds" are considered a type of wirebond.) Other types of connections, e.g., edge connections may be substituted for wirebonds 41. PCB section 34_1 may have a metal layer on its rear surface that functions as a ground plane for a microstrip transmission line medium. Alternatively, ground plane 47 on antenna substrate 25 may serve as the microstrip ground plane. Note that in FIG. 4, antenna substrate 25 is shown as a single-layer substrate, but there may be additional, thin redistribution layers (RDLs) present for DC routing between RFICs 32 and/or within individual RFICs 32. Thus, "single-layer" in this context refers to a single RF layer. In an alternative embodiment, antenna substrate 25 is configured as a multi-layer substrate, that is, a multi-RF-layer substrate. In this case, the added layer(s) of antenna substrate 25 is used to form an RF transmission line to connect RFICs 32 to PCB 34, as a substitute for the wirebonds. The RF transmission line may be, e.g., microstrip, stripline, or coplanar waveguide. It is further noted here, although not shown in FIG. 4, RF connector 59 may also be mounted to the lower surface 27 of antenna substrate 25.

Figure 5:
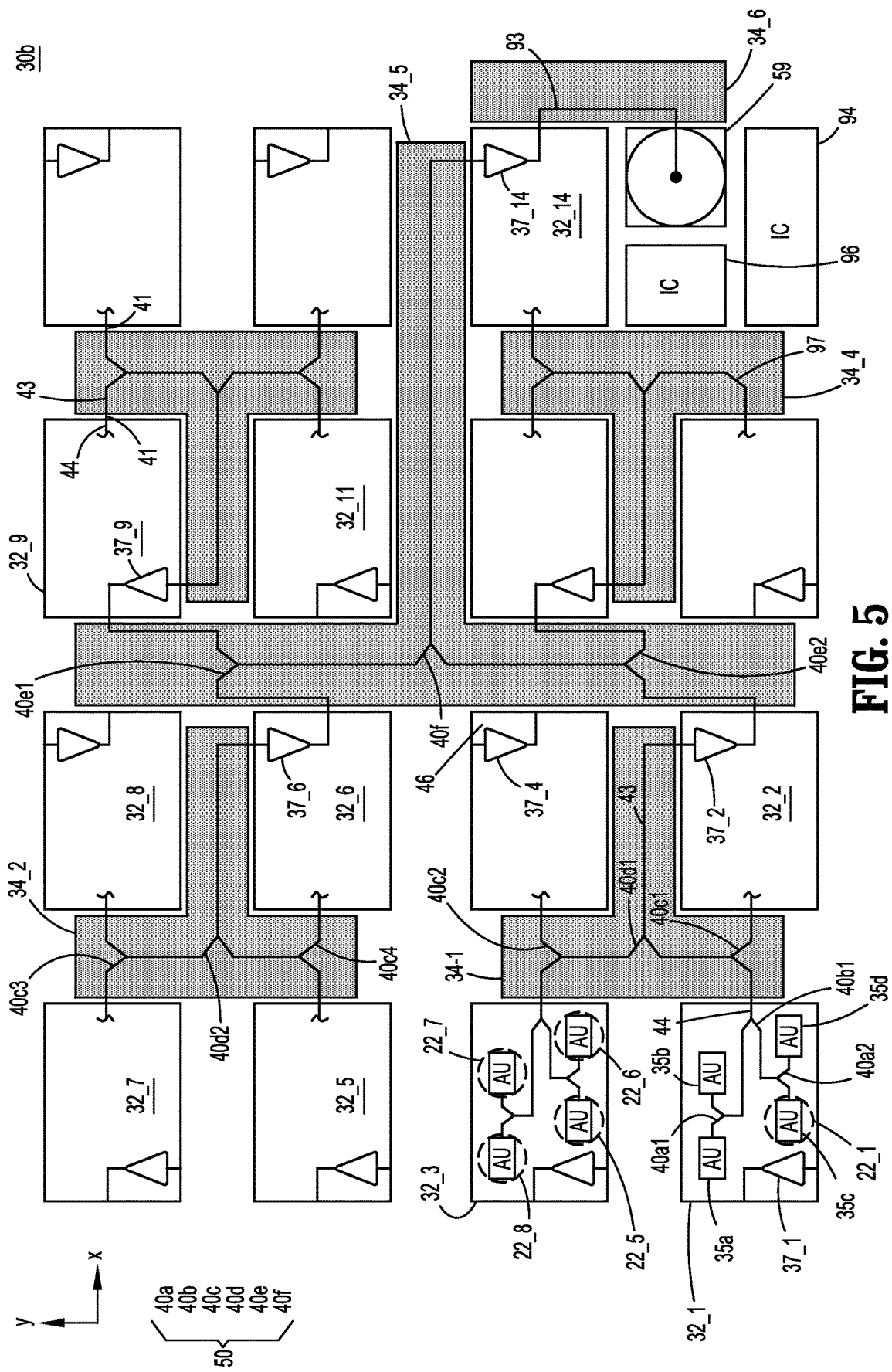
FIG. 5 is a plan view of a layout of another example component layer in the antenna apparatus of FIG. 1.

FIG. 5 is a plan view of a layout of another example second component layer 30b that many be employed in antenna 10. Second component layer 30b differs from component layer 30a by omitting RFIC 32_16 and replacing 2:1 combiner 40c8 with just a signal line 97 such that BFN 50 is a 60:1 combiner. RF connector 59 is moved to the space previously occupied by RFIC 32_16 and is connected to the output of amplifier 37_14 through a signal line 93 of an additional PCB section 34_6. One or more additional ICs 94, 96 with any desired functionality may also be placed in the newly unoccupied space adjacent to RF connector 59. Otherwise, the configuration and operations of second component layer 30b may be the same as that described for component layer 30a.

Figure 6:
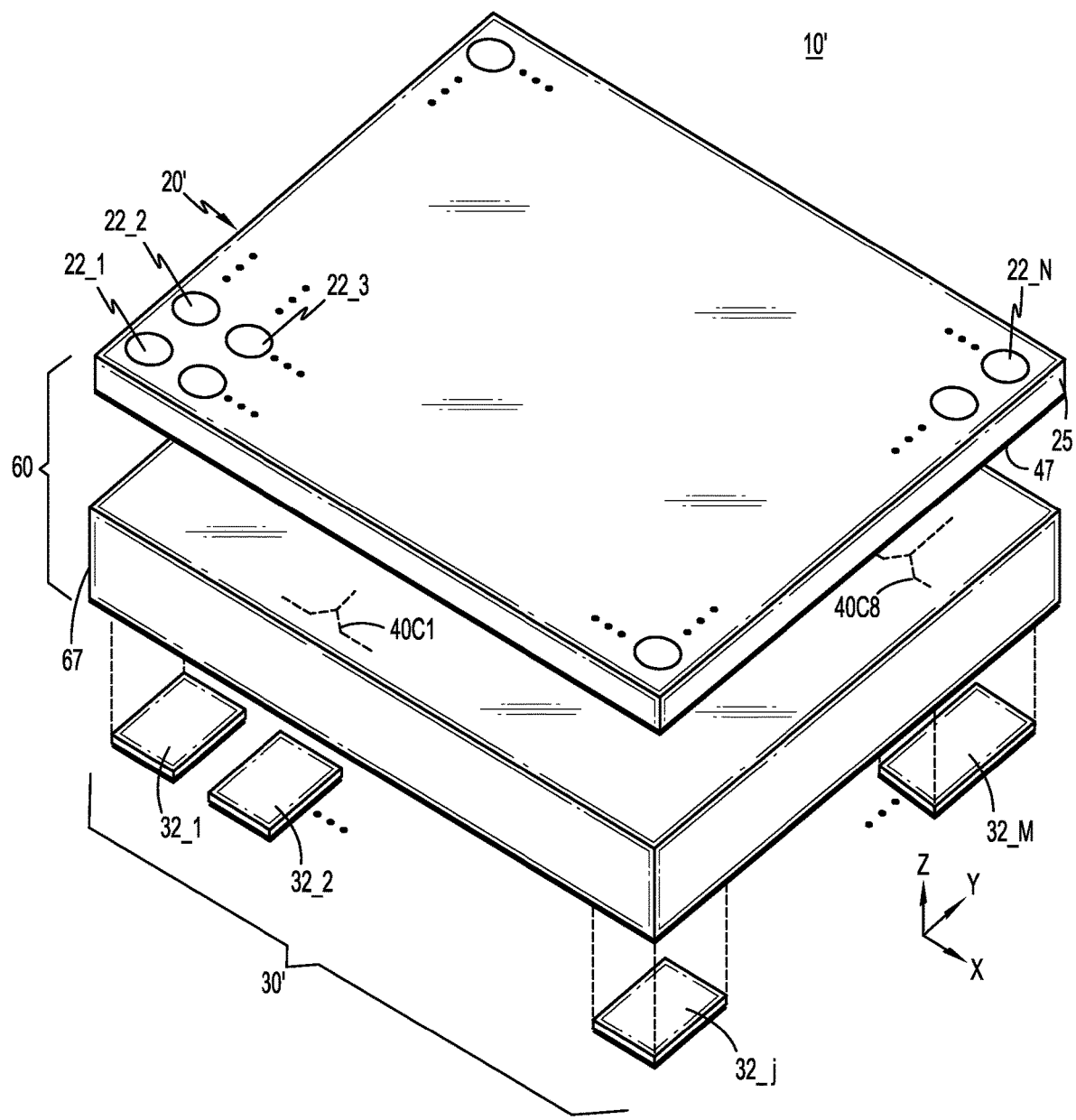
FIG. 6 is an exploded perspective view of another example antenna apparatus according to an embodiment.

FIG. 6 is an exploded perspective view of another example antenna, 10', according to an embodiment. Antenna 10' may have the same general functionality and many of the benefits as antenna 10 described above, but with a different construction. Antenna 10' omits coplanar PCB 34 of antenna 10 and instead provides the PCB BFN stages (e.g. with combiners 40c1, 40c8, etc. as illustrated) within a multi-layer PCB 60. PCB 60 may be comprised of antenna substrate 25, a multi-layer substrate 67, and a metal layer therebetween forming ground plane 47. RFICs 32_1 to 32_M are mounted to a lower surface of PCB 60. Thus, antenna elements 22_1 to 22_N form a first component layer 20' of antenna 10'; RFICs 32_1 to 32_M form a second component layer 30' of antenna 10'; and PCB 60 is disposed between first and second component layers 20' and 30'. A plurality of first vias partially extending within substrate 67 electrically connect the BFN stages within PCB 60 to RFICs 32. A plurality of second vias extending completely through substrate 67 and antenna substrate 25 electrically connect signal connection points on RFICs 32 to antenna elements 22.

Figure 7A:
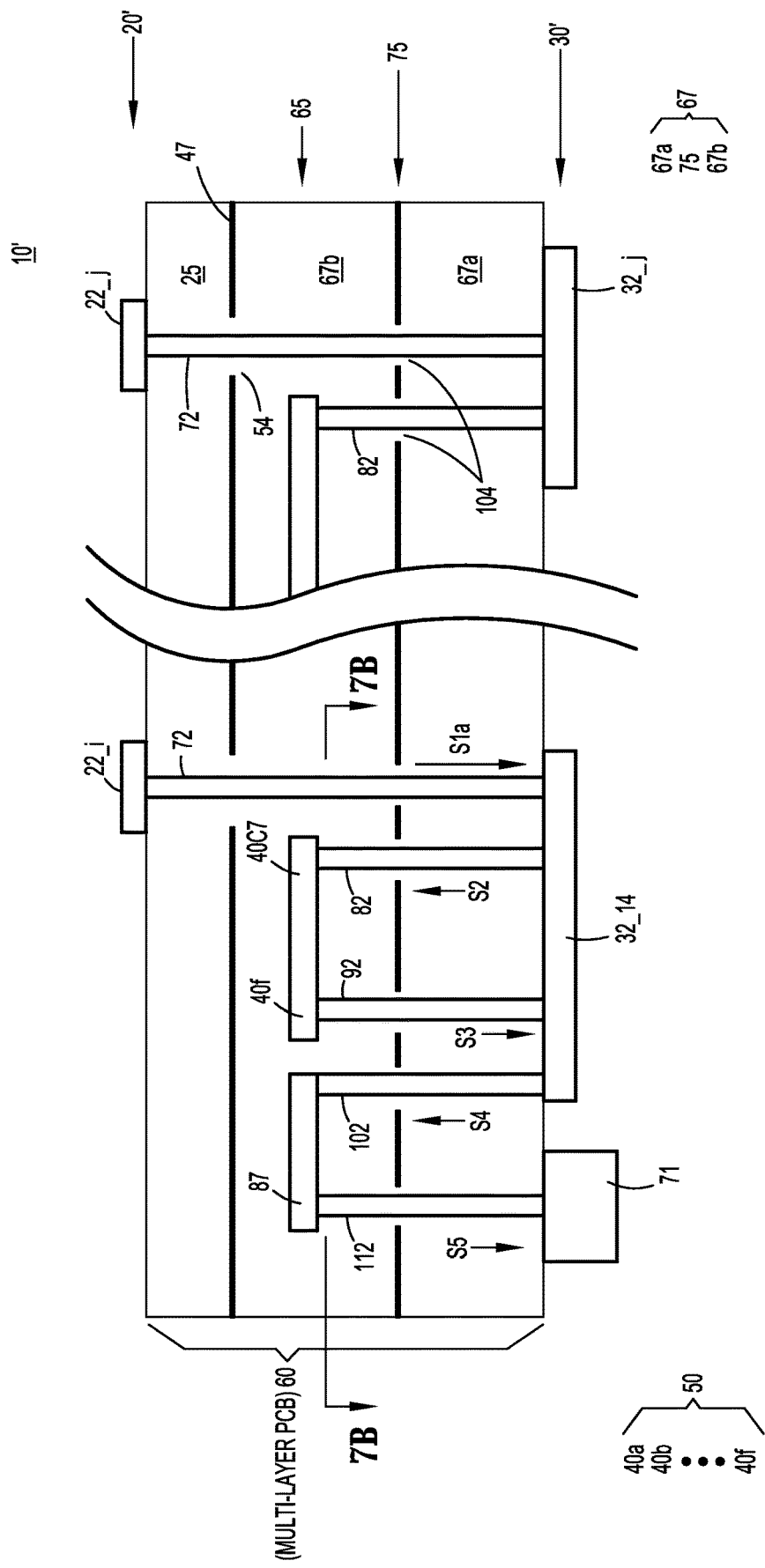
FIG. 7A is a cross-sectional view showing an example construction of an exemplary portion of the antenna apparatus of FIG. 6.

FIG. 7A is a cross-sectional view showing an example structure of a portion of antenna 10' of FIG. 6. First component layer 20' comprises antenna elements such as 22_i, 22_j, and second component layer 30' may comprise RFICs such as 32_14 and 32_j, and an RF connector 71. PCB 60 in this example is comprised of antenna substrate 25, antenna ground plane 47, and multi-layer substrate 67. Multi-layer substrate 67 may be comprised of a lower substrate portion 67a, an upper substrate portion 67b, a first metal layer 65 within upper substrate portion 67b, and a second metal layer 75 between lower and upper substrate portions 67a, 67b. First metal layer 65 is patterned to form signal lines and combiners for the PCB stages of BFN 50. The signal lines of the PCB stages of BFN 50 may be signal lines of microstrip, stripline or coplanar waveguide (CPW) transmission lines. Second metal layer 75 may be patterned to form a microstrip or stripline ground plane for the signal lines of first metal layer 65. Another portion of second metal layer 75 may be patterned to form DC signal lines that connect between different RFICs 32 and/or connect to different connection points within an individual RFIC 32.

Second vias 72 connect signal connection points on RFICs 32 to respective antenna elements 22 by extending through both multi-layer substrate 67 and antenna substrate 25. Ground plane 47 has openings 54 therein, and second metal layer has openings 104 to permit second vias 72 to traverse the substrates without shorting out. First vias such as 82, 92, 102 and 112 extend from connection points on RFICs 32 to first metal layer 65 to connect the on-chip BFN stages to the PCB BFN stages. For example, first metal layer 65 may be patterned to form a BFN layout similar to either of those shown in FIG. 2 or 5 of the coplanar design of second component layer 30. FIG. 7A shows an example in which first metal layer 65 includes a third stage combiner 40c7 connected to a first via 82, and sixth stage combiner 40f connected to a first via 92. It is noted here that if the PCB BFN is constructed with CPW, one or more additional vias adjacent to vias 82, 92, etc. depicted would be provided to produce a ground-signal-ground (GSG) or a ground-signal (GS) connection to the CPW lines. That is, the shown vias 82, 92, etc. may be "signal vias" of the GSG or GS connection, and one or more adjacent vias are provided for "ground vias" each connecting a ground contact on the RFIC 32 and the ground of the CPW transmission line.

Figure 7B:
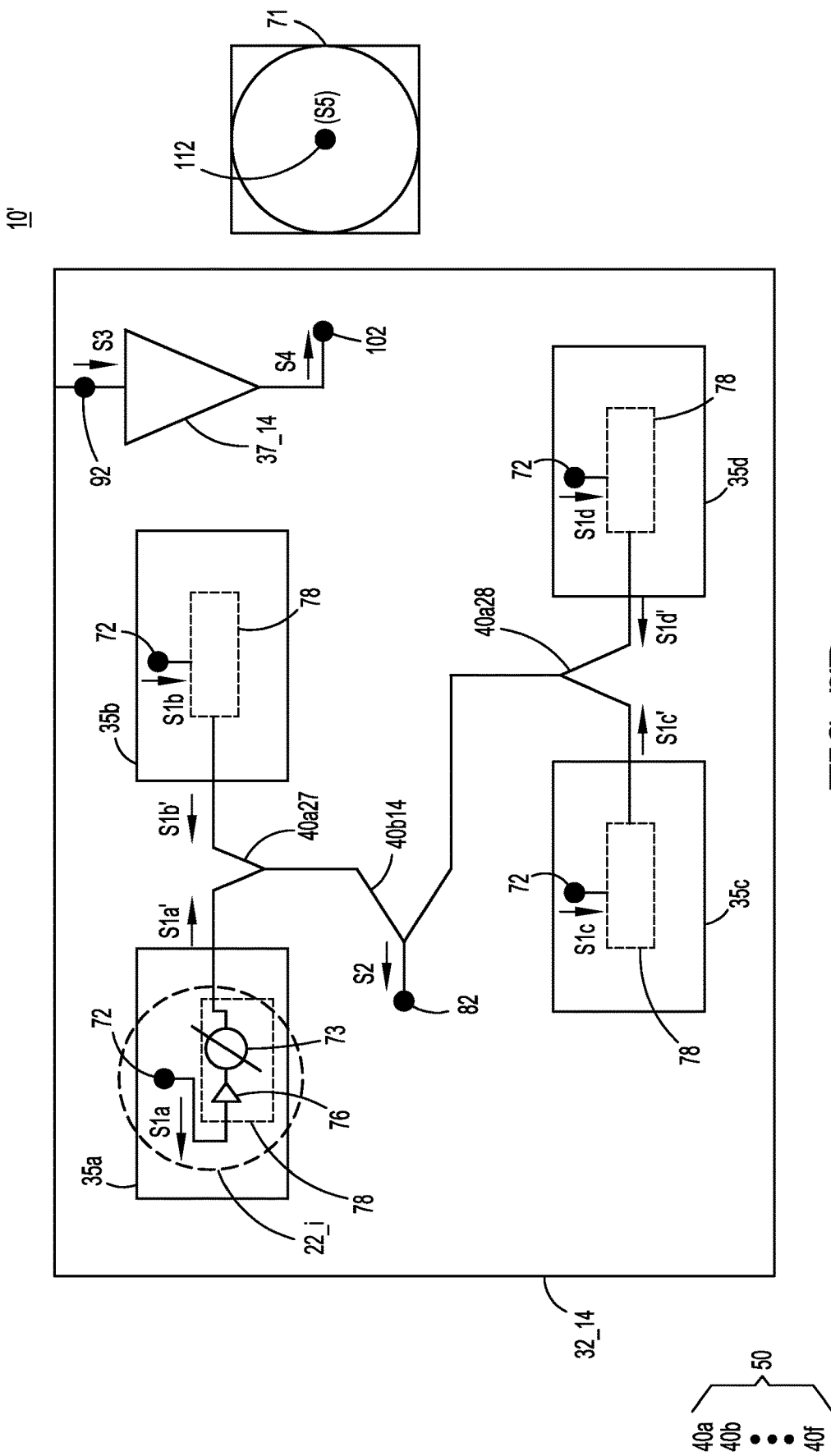
FIG. 7B is a sectional view taken along the lines 7B-7B of FIG. 7A.

FIG. 7B is a sectional view taken along the lines 7B-7B of FIG. 7A, with metal layer 75 removed for clarity. This view depicts an example circuit configuration of RFIC 32_14, which may be the same for all RFICs 32_1 to 32_M of antenna 10'. For example, RFICs 32_1 to 32_M may all be identical and have substantially the same relative orientations to each other from column to column and row to row in second component layer 30' as they do in component layer 30a or 30b in FIG. 2 or FIG. 5. However, since space is not needed between adjacent RFICs 32 in antenna 10' for coplanar PCB sections 34, more flexibility is available in the layouts of RFICs 32 and/or the PCB BFN 50 portion within multi-layer substrate 60. The RFICs 32 of second component layer 30' may have the same or similar internal layout as those of component layer 30a/30b except that the connections of the on-chip BFN stages to the PCB BFN stages are made through first vias 82, 92, etc. rather than through wirebonds or edge connections. For instance, RFIC 32_14 may comprise four active circuit units (AUs) 35a to 35d, each including an adjuster circuit 78 having an LNA 76 and a phase shifter 73. RFIC 32_14 may further include first stage combiners 40a27 and 40a28, a second stage combiner 40b14, and an intermediate amplifier 37_14 that amplifies a finally combined signal in the same manner as described above for second component layers 30a and 30b.

In a receive antenna system operation, element signals s1a, s1b, s1c and s1c may be respectively provided from four antenna elements 22 (only one element 22_i is illustrated) to AUs 35a, 35b, 35c and 354d, respectively, through second vias 72 connected to the four antenna elements 22. Each of these element signals may be adjusted in adjuster circuits 78 of AUs 35a-35d which thereby output adjusted element signals s1a', s1b', s1c' and s1d', respectively. (Only signal s1a is shown in FIG. 7A; the other three element signals may be provided from the other three antenna elements 22 in the same way.) The adjusted element signals s1a'-s1d' are combined by combiners 40a27, 40a28 and 40b14 to produce a second stage output signal s2. Signal s2 is routed up a first via 82 and provided to the PCB BFN within the multi-layer substrate 60. A connection point of a third stage combiner 40c7 may connect to the first via 82 providing signal s2. Combiner 40c7 may combine signal s2 with another second stage signal from an adjacent RFIC 37_13 (not shown in FIGS. 7A-7B), akin to the layout shown in FIG. 2. As in the layout of FIG. 2, a combined output of combiner 40c7 may be combined in a fourth stage combiner 40d4, and the fourth stage output signal is amplified by an intermediate amplifier 37_13 of RFIC 37_13. A sixth stage combined signal s3 from sixth stage combiner 40f (coupled to combiner 40c7 as in FIG. 2) may then be routed back to RFIC 32_14 through a first via 92, where it is applied as an input signal to amplifier 37_14 for additional amplification, resulting in signal s4. Signal s4 is routed through another first via 102 to a signal line 87 of BFN 50, and then through another first via 112 to become output signal s5. Output signal s5 is provided to RF connector 71 as the final combined signal.

If antenna 10' is configured as a transmit antenna system, a reciprocal operation may be realized. In this case, the intermediate amplifiers 37 may be flipped around, and power amplifiers may replace the LNAs 76. Intermediate amplifier 37_14 may amplify the input RF signal from RF connector 71, which is then output to sixth stage combiner/divider 40f operating as a divider to divide the transmit signal s3 flowing in the reverse direction as in FIGS. 7A and 7B, and so on.

Accordingly, antenna 10', which includes individual RFICs that may provide multi-level amplification, exhibits many of the same benefits as described above for antenna 10 of FIG. 1. As is the case for antenna 10, antenna 10' includes a hybrid beamformer that can provide higher performance and lower cost as compared to an antenna implementing the entire BFN on only RFICs or only a PCB. The hybrid beamformer can permit flexibility and a lower development cost by allowing for the use of more general RFICs in conjunction with the PCB circuitry. In addition, the hybrid beamformer can avoid the mechanical challenges and yield issues associated with implementing the entire beamformer on just the PCB or just RFICs. Further, the benefits of the intermediate amplification in antenna 10' in terms of flexibility of design and optimization of the noise figure to DC power consumption tradeoff, are the same as that described for antenna 10.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An antenna apparatus comprising:
a first component layer comprising a plurality of antenna elements forming an antenna array; and
a second component layer comprising:
a plurality of radio frequency integrated circuit chips (RFICs) coupled to the antenna elements, each RFIC comprising active beamforming circuitry to adjust signals communicated with one or more of the antenna elements, and a portion of a first combining/dividing stage of a beamforming network (BFN); and
at least an additional combining/dividing stage and a further combining/dividing stage of the BFN, each disposed externally of the RFICS;
wherein at least some of the RFICs include an intermediate amplifier coupled between the additional and further combining/dividing stages of the BFN.

2. The antenna apparatus of claim 1, wherein:
the active beamforming circuitry of an RFIC comprises at least one front end amplifier; and
the at least one front end amplifier is at least one of a transmit amplifier for amplifying a signal for transmission by at least one antenna element, and a receive amplifier for amplifying signals received by at least one antenna element.

3. The antenna apparatus of claim 1, wherein the active beamforming circuitry comprises at least one phase shifter for beam steering.

4. The antenna apparatus of claim 1, wherein the plurality of RFICs are coplanarly arranged, and the additional and further combining/dividing stages of the BFN are arranged on at least one dielectric substrate coplanarly situated between the RFICs, the additional and further combining/dividing stages of the BFN being wire bonded to connection points of the RFICs.

5. The antenna apparatus of claim 4, wherein the at least one dielectric substrate comprises a plurality of sections of alumina.

6. The antenna apparatus of claim 1, wherein:
the first component layer comprises an antenna substrate having a front surface interfacing with the antenna elements, a rear surface at which a ground plane is formed, and a plurality of vias formed through the antenna substrate coupling the antenna elements to the RFICs; and
the RFICs face the rear surface of the antenna substrate.

7. The antenna apparatus of claim 6, wherein the RFICs are mounted to the rear surface of the antenna substrate.

8. The antenna apparatus of claim 6, wherein:
the first component layer is disposed at an upper level of the antenna apparatus, and the plurality of RFICs are coplanarly arranged at a lower level of the antenna apparatus; and
the second component layer comprises a multi-layer printed circuit board (PCB) between the plurality of RFICs and the antenna elements, the antenna substrate is one layer of the multi-layer PCB, and the multi-layer PCB comprising the additional and further combining/dividing stages of the BFN.

9. The antenna apparatus of claim 8, wherein the multi-layer PCB comprises an upper dielectric layer adjacent the antenna substrate, a lower dielectric layer adjacent the RFICs, and a patterned metal layer between the upper and lower dielectric layers to form the additional and further combining/dividing stages of the BFN, each of the additional and further combining/dividing stages of the multi-layer PCB being coupled to connection points of the RFICs through respective vias formed through the lower dielectric layer.

10. The antenna apparatus of claim 1, wherein:
a total of M intermediate amplifiers are included within a total of M said RFICs; and
K<M of the intermediate amplifiers are coupled between the additional and further combining/dividing stages.

11. The antenna apparatus of claim 10, wherein each of the RFICs has an identical design configuration.

12. The antenna apparatus of claim 1, wherein:
each of the RFICs has an identical design configuration and a rectangular profile;
the RFICs are arranged in rows and columns along a two dimensional (2D) surface; and
the RFICs are successively rotated by 180° in a plane of the 2D surface in each row from column to column.

13. The antenna apparatus of claim 1, wherein the RFICs and the antenna elements are configured for millimeter wave operations.

14. The antenna apparatus of claim 1, wherein:
a total of M intermediate amplifiers are included within a total of M said RFICs;
the RFICs each have a rectangular profile and are arranged in rows and columns along a two dimensional (2D) surface to form a 2D profile along the 2D surface; and
the M intermediate amplifiers are each disposed at a corner location of a respective one of the RFICs.

15. The antenna apparatus of claim 14, wherein the additional and further combining/dividing stages of the BFN are arranged on at least one dielectric substrate situated between the RFICs, the additional and further combining/dividing stages of the BFN being wire bonded to connection points at the corner locations of the RFICs at which a plurality K of the M intermediate amplifiers are located, where K<M.

16. The antenna apparatus of claim 15, wherein:
the further combining/dividing stage of the BFN is disposed at a central region of the 2D profile and the additional combining/dividing stage of the BFN is disposed in regions between the RFICs outside the central region.

17. The antenna apparatus of claim 16, wherein locations of the intermediate amplifiers within the RFICs alternate from first corner locations to second, diagonally opposite corner locations in successive ones of the columns.

18. The antenna apparatus of claim 1, wherein:
the active beamforming circuitry of each RFIC includes at least one phase shifter for steering an antenna beam, and at least one front end amplifier;
the plurality of antenna elements is N antenna elements;
the plurality of RFICs is M RFICs, where M<N, and each RFIC is coupled to (N/M) of the antenna elements.

19. The antenna apparatus of claim 1, wherein the first component layer comprises an antenna substrate having a front surface interfacing with the antenna elements, a rear surface at which a ground plane is formed with openings for connections to antenna feeds, and a plurality of vias formed through the antenna substrate forming the antenna feeds, the antenna feeds being connected to the RFICs through the openings; and
the RFICs are mounted to the rear surface of the antenna substrate.

20. The antenna apparatus of claim 1, wherein:
the active beamforming circuitry of each RFIC adjusts signals communicated with four antenna elements;
each of the RFICs further comprises a portion of a second combining/dividing stage of the BFN;
at least third, fourth and fifth combining/dividing stages of the BFN are formed in the second component layer externally of the RFICs;
the additional combining/dividing stage is the fourth combining/dividing stage of the BFN; and
the further combining/dividing stage is the fifth combining/dividing stage of the BFN.

* * * * *